(12) United States Patent
Steckel et al.

(10) Patent No.: US 9,016,398 B2
(45) Date of Patent: Apr. 28, 2015

(54) DISC-SHAPED TORQUE TRANSDUCER

(75) Inventors: John Paul Steckel, Allentown, PA (US); Daniel Jay Becker, Monroe Township, NJ (US)

(73) Assignee: Ingersoll-Rand Company, Davidson, NC (US)

( * ) Notice: Subject to any disclaimer, the term of this patent is extended or adjusted under 35 U.S.C. 154(b) by 1657 days.

(21) Appl. No.: 12/328,035

(22) Filed: Dec. 4, 2008

(65) Prior Publication Data

US 2010/0139432 A1    Jun. 10, 2010

(51) Int. Cl.
| | |
|---|---|
| *B23Q 5/00* | (2006.01) |
| *B25B 21/00* | (2006.01) |
| *B25B 23/142* | (2006.01) |
| *B25F 5/00* | (2006.01) |
| *G01L 3/14* | (2006.01) |

(52) U.S. Cl.
CPC ............ *B25B 21/00* (2013.01); *B25B 23/1425* (2013.01); *B25F 5/001* (2013.01); *G01L 3/1457* (2013.01)

(58) Field of Classification Search
USPC ................ 173/181–182; 73/862.045, 862.06, 73/862.191, 862.338, 861.21, 861.22, 73/861.191
See application file for complete search history.

(56) References Cited

U.S. PATENT DOCUMENTS

| | | | |
|---|---|---|---|
| 3,616,864 A * | 11/1971 | Sorensen et al. ............... 173/176 |
| 4,078,618 A | 3/1978 | DePagter et al. |
| 4,223,745 A | 9/1980 | Workman, Jr. |
| 4,333,220 A | 6/1982 | Aspers |
| 4,418,590 A * | 12/1983 | Dubiel et al. .................... 81/467 |
| 5,062,491 A | 11/1991 | Takeshima et al. |
| 5,172,774 A * | 12/1992 | Melrose ......................... 173/182 |
| 5,404,775 A | 4/1995 | Abe |
| 5,533,410 A * | 7/1996 | Smith ....................... 73/862.193 |
| 5,647,254 A | 7/1997 | Cook, Jr. |
| 5,780,751 A * | 7/1998 | Nomerange et al. ...... 73/862.325 |
| 7,021,159 B2 * | 4/2006 | Liu et al. ................... 73/862.045 |
| 7,770,471 B2 * | 8/2010 | Lohr et al. ................ 73/862.338 |
| 2004/0045375 A1 * | 3/2004 | Fite et al. ................. 73/862.338 |
| 2005/0150335 A1 * | 7/2005 | Crane ............................. 81/467 |

(Continued)

FOREIGN PATENT DOCUMENTS

| | | |
|---|---|---|
| CN | 1796054 | 7/2006 |
| GB | 2292811 | 3/1996 |

OTHER PUBLICATIONS

PCT/US2009/066775 International Search Report and Written Opinion dated Jan. 28, 2010 (10 pages).

(Continued)

*Primary Examiner* — Robert Long
(74) *Attorney, Agent, or Firm* — Barnes & Thornburg LLP

(57) ABSTRACT

A power tool includes a motor having an output shaft that defines an axis, a drive train connected to the output shaft and operable to drive a tool output and a housing at least partially surrounding the motor and the drive train. The power tool further includes a reference disk fixed to the housing, a collar including internal teeth that engage at least a portion of the drive train and a torque transducer having a hub, a web and a rim. The torque transducer is positioned between the collar and the reference disk such that the rim is connected to the collar and the hub is connected to the reference disk. The web defines a first thickness measured parallel to the axis and the rim defines a second thickness measured in a radial direction with respect to the axis, such that the second thickness is greater than the first thickness.

20 Claims, 6 Drawing Sheets

FIG. 2

(56) References Cited

U.S. PATENT DOCUMENTS

| | | |
|---|---|---|
| 2006/0005637 A1 | 1/2006 | Hirai et al. |
| 2006/0117868 A1* | 6/2006 | Liu et al. .................. 73/862.045 |
| 2008/0000333 A1 | 1/2008 | Seno |
| 2008/0060451 A1* | 3/2008 | Puzio ........................ 73/862.324 |
| 2009/0013803 A1* | 1/2009 | Lohr et al. ............... 73/862.338 |
| 2009/0314104 A1* | 12/2009 | Lohr et al. ............... 73/862.338 |

OTHER PUBLICATIONS

Second Office Action from the Intellectual Property Office of the People's Republic of China for Application No. 200980150095.2 dated Nov. 12, 2013 (26 pages).

First Office Action from the Intellectual Property Office of the People's Republic of China for Application No. 200980150095.2 dated Apr. 3, 2013 (30 pages).

* cited by examiner

DISC-SHAPED TORQUE TRANSDUCER

BACKGROUND

This invention relates generally to devices for monitoring stress and strain in dynamic structures and more particularly to transducers for measuring the output torque of power tools and other rotating machinery.

Monitoring of dynamic stresses and strains in power tools and other rotating machinery is often desirable. The data received from such operations permit evaluation of the performance of the equipment in question. In the case of power tools, such as nutrunners or screwdrivers, the data permit measurement of the torque output and thereby calculation of fastener tension produced by the tool. Real time feedback coupled with programmable controls makes it possible to automatically deactivate the tool power when a desired fastener tension is achieved. This provides the benefit of reproducible fastener tensioning in assembly line or other mass production operations. A variety of transducers are available for measuring torque output of rotating machines. In many cases, the axial dimensions of the transducer are such that their use requires an unacceptable increase in the size of the tool. When the tool must be used in a limited space environment, such size increases may be intolerable. In such cases, fastener tension can only be determined by use of tortuous tool combinations of questionable accuracy. In addition, an excessive increase in size can contribute to increased weight and unwieldy proportions which can contribute to premature operator fatigue and otherwise degrade operator performance.

SUMMARY

In one embodiment, the invention provides a power tool that includes a motor having an output shaft that defines an axis, a drive train connected to the output shaft and operable to drive a tool output, and a housing at least partially surrounding the motor and the drive train. The power tool further includes a reference disk fixed to the housing, a collar including internal teeth that engage at least a portion of the drive train and a torque transducer having a hub, a web and a rim. The torque transducer is positioned between the collar and the reference disk such that the rim is connected to the collar and the hub is connected to the reference disk. The web defines a first thickness measured parallel to the axis and the rim defines a second thickness measured in a radial direction with respect to the axis, such that the second thickness is greater than the first thickness.

In another embodiment, the invention provides a torque transducer that includes a hub defining an aperture and having an axis. The hub has a hub first end and a hub second end spaced along the axis, and defines a first thickness in a radial direction perpendicular to the axis. The torque transducer further includes a web connected to the hub at the hub first end. The web defines an unbroken ring in a plane perpendicular to the axis and defines a second thickness measured in the direction of the axis, such that the second thickness is less than one half of the first thickness. The torque transducer further includes a rim that has a rim first end and a rim second end spaced from the rim first end along the axis. The rim is connected to the web and defines a perimeter that includes at least one keyway in an exterior of the perimeter.

In another embodiment the invention provides a torque transducer having a hub that defines an aperture that has an axis. The hub has a proximal hub first end and a distal hub second end spaced along the axis, and defines a first thickness in a radial direction, perpendicular to the axis. The hub defines a substantially cylindrical shape having an inner surface and an outer surface, such that the inner surface is smooth and the outer surface includes a plurality of teeth extending from the hub second end toward the hub first end. The torque transducer further includes a web connected to the hub at the proximal hub first end. The web defines an unbroken ring in a plane perpendicular to the axis and defines a second thickness measured in the direction of the axis, such that the second thickness is less than one half of the first thickness. The torque transducer further includes a rim that has a rim first end and a rim second end spaced from the rim first end along the axis. The rim is connected to the hub between the rim first end and the rim second end, such that the web bisects the rim. The rim defines a perimeter that includes first and second keyways in an exterior of the perimeter, such that the first keyway is diametrically opposed from the second keyway. The keyways extend parallel to the axis at the rim second end and taper outward at the rim first end, such that the keyways are wider at the rim first end than at the rim second end. The rim defines a first rim thickness measured in a radial direction at the rim first end and a second rim thickness measured in a radial direction at the rim second end, such that the second rim thickness is greater than the first rim thickness, and the second thickness is less than half of each of the first rim thickness and the second rim thickness. The web and rim define a first cavity that extends from one portion of the rim to a diametrically opposed portion of the rim uninterrupted by the hub, and the web, rim and hub define a second cavity that extends from the rim to the hub.

Other aspects of the invention will become apparent by consideration of the detailed description and accompanying drawings.

DETAILED DESCRIPTION

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways. Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items. Unless specified or limited otherwise, the terms "mounted," "connected," "supported," and "coupled" and variations thereof are used broadly and encompass both direct and indirect mountings, connections, supports, and couplings. Further, "connected" and "coupled" are not restricted to physical or mechanical connections or couplings.

Figure 1:
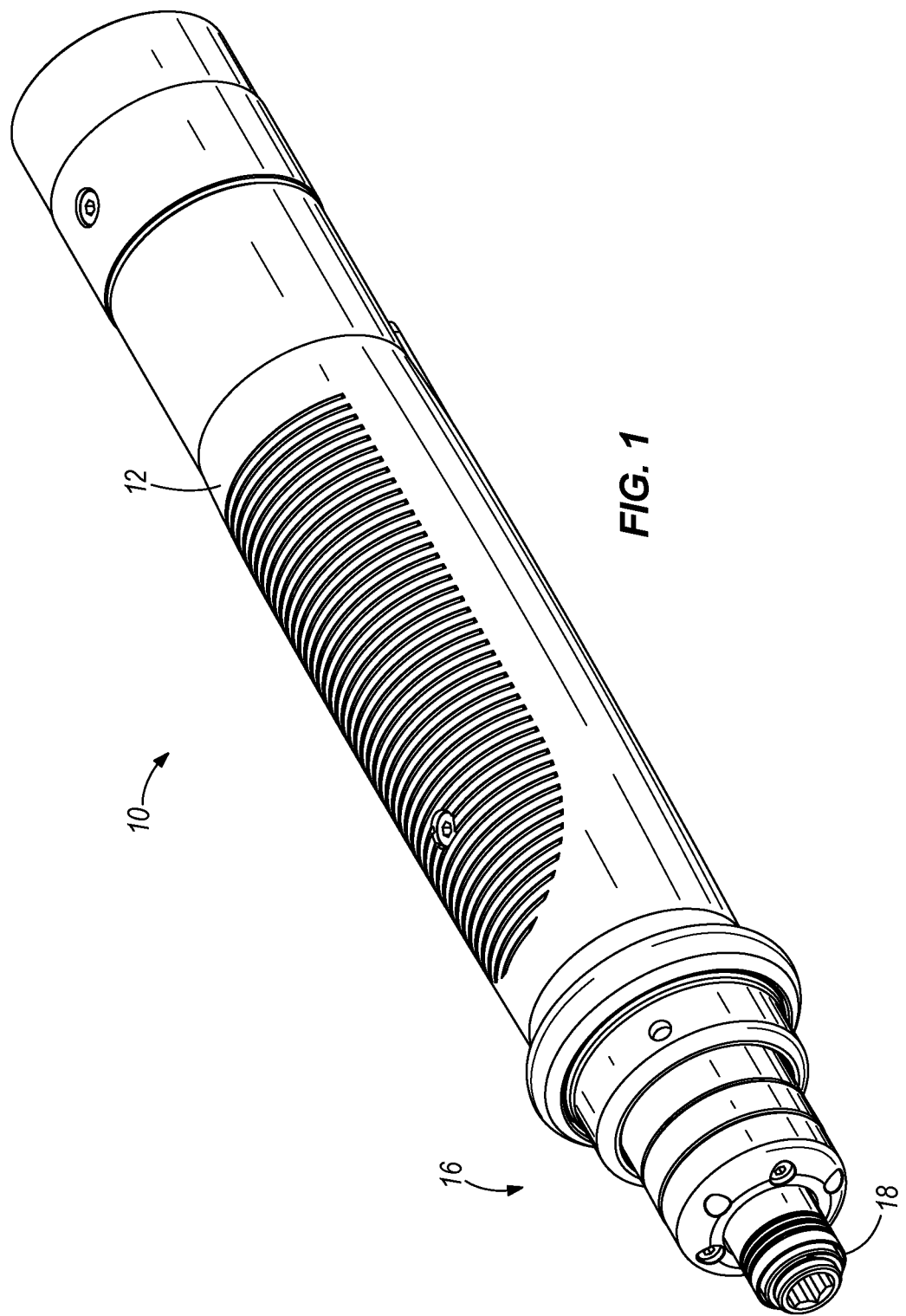
FIG. 1 is a perspective view of a power tool.
Figure 2:
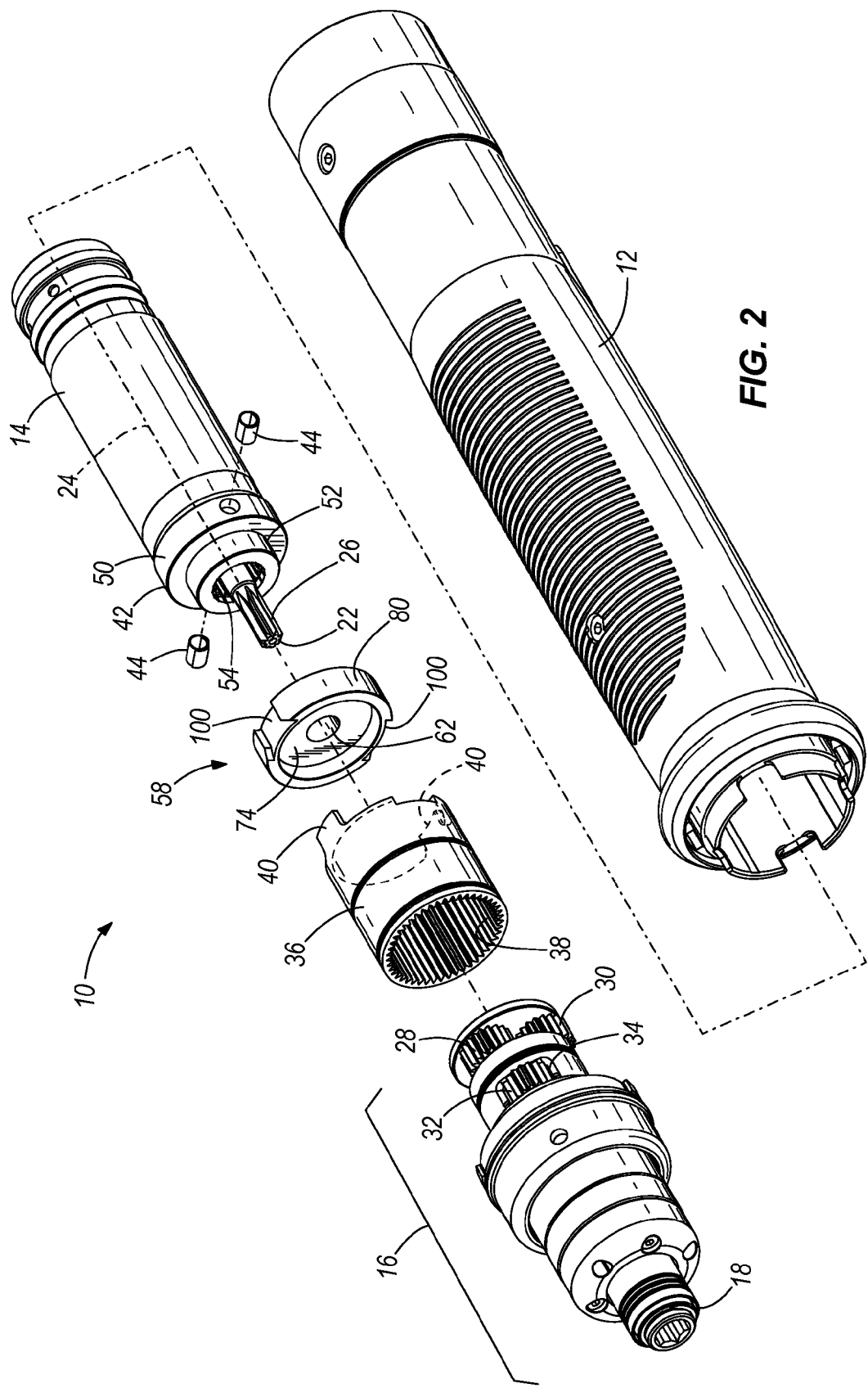
FIG. 2 is an exploded view of the power tool including a torque transducer.

FIGS. 1 and 2 illustrate a power tool 10 that includes a housing 12, a motor 14, a drive train 16 and a tool output 18. The housing 12 substantially surrounds the motor 14 and partially surrounds the drive train 16. The motor 14 includes an output shaft 22 that defines an output shaft axis 24 and includes a plurality of splines or teeth 26. The output shaft 22 driving engages the drive train 16, which thereby drives the tool output 18.

The drive train 16 includes a first set of gears 28 that include external teeth 30 that substantially mate with the teeth 26 of the output shaft 22 (see FIG. 2). The drive train further includes a second set of gears 32 that include external teeth 34 that drivingly engage a drive shaft that drives the tool output 18. The first set of gears 28 includes three planet gears that orbit about the output shaft 22 (see FIG. 4). The second set of gears 32 includes three planet gears that orbit about the output shaft axis 24 to drive the tool output 18 through a drive sleeve or other driving arrangement.

Figure 3:
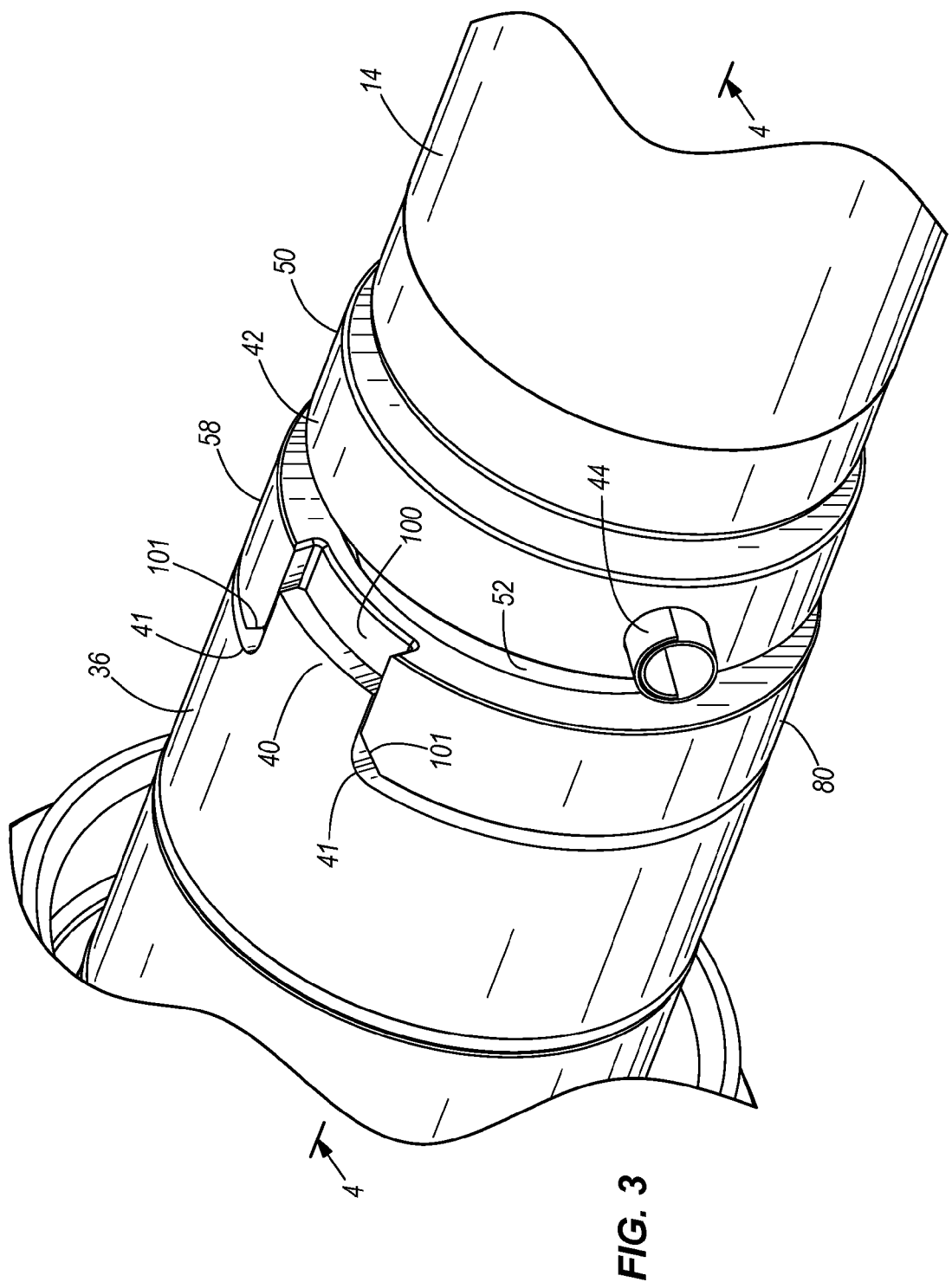
FIG. 3 is a close-up perspective view of the torque transducer in the power tool.
Figure 4:
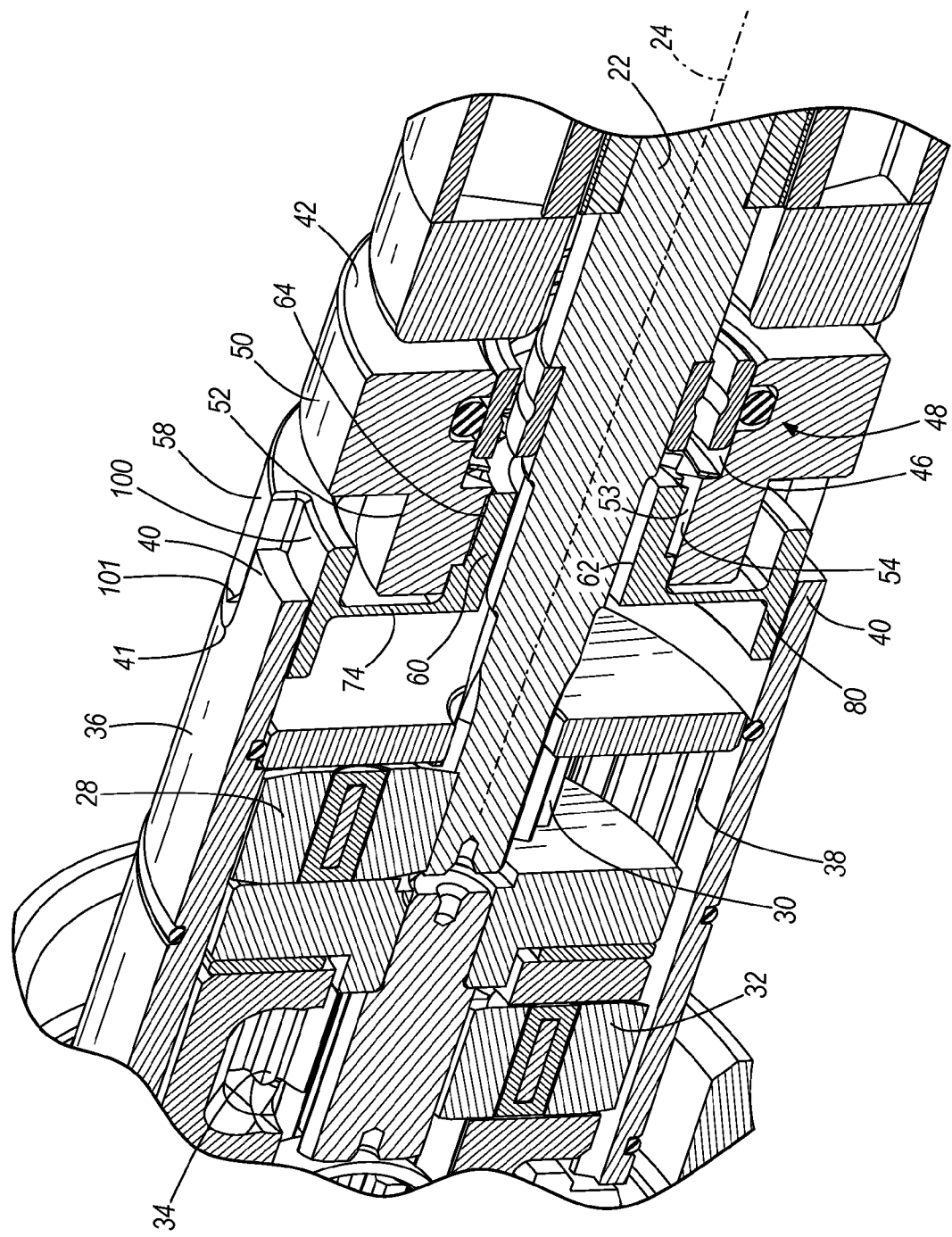
FIG. 4 is a cross-sectional view of the torque transducer and a portion of the power tool along line 4-4 of FIG. 3.
Figure 5:
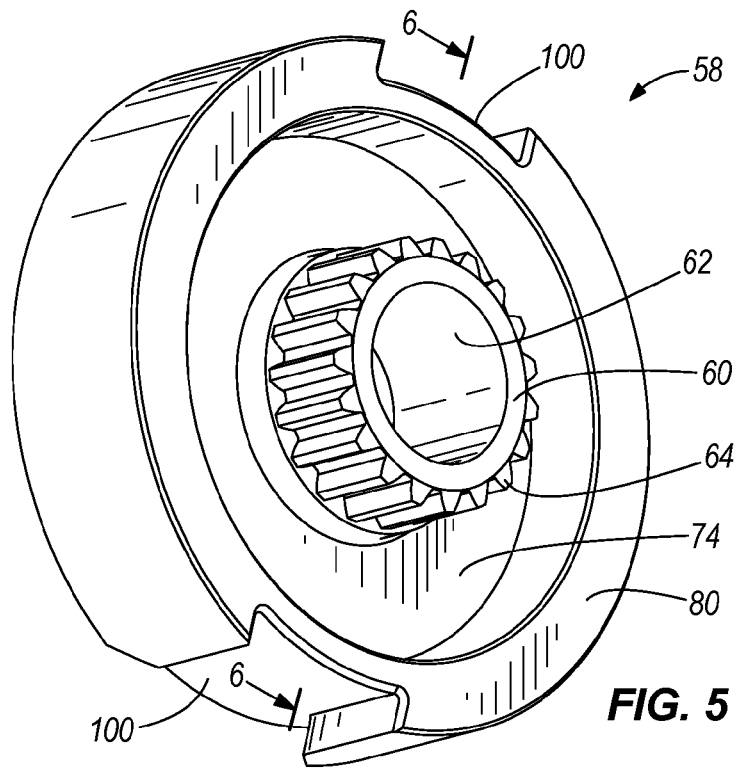
FIG. 5 is a perspective view of the torque transducer.
Figure 6:
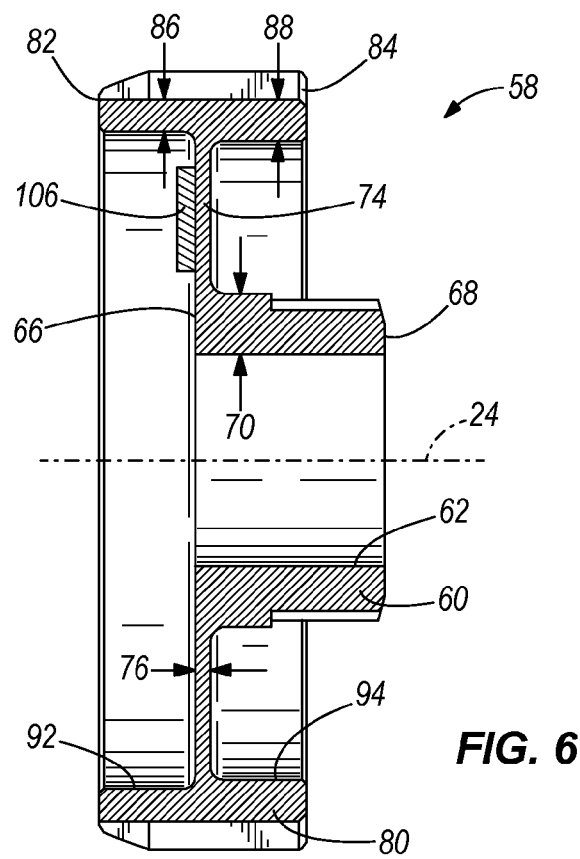
FIG. 6 is a cross-sectional view of the torque transducer along line 6-6 of FIG. 5.
Figure 7:
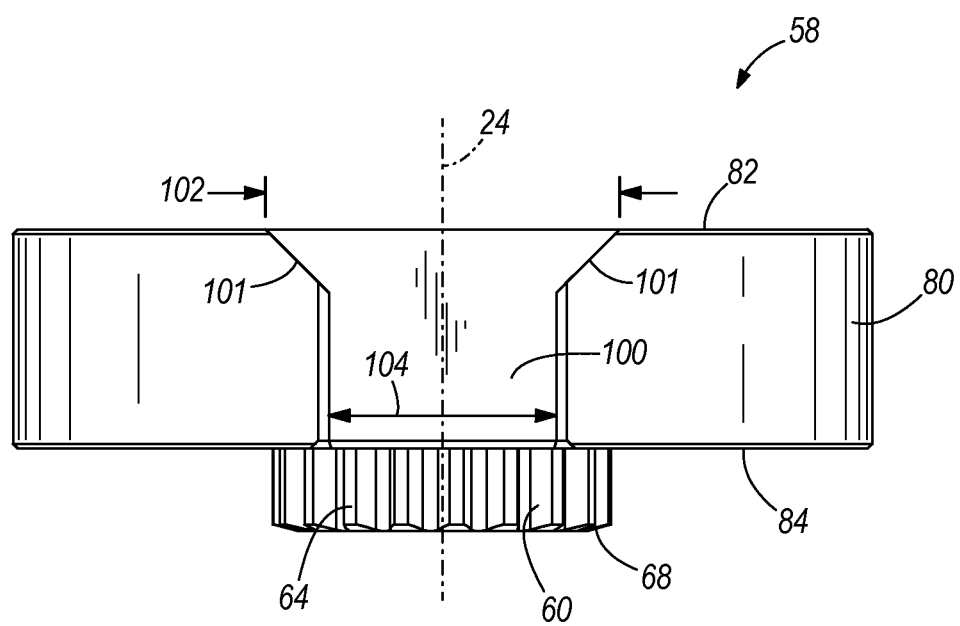
FIG. 7 is a top view of the torque transducer.

A drive collar 36 extends along the output shaft axis 24 around a portion of the drive train 16 (see FIGS. 2-4). The drive collar 36 includes internal teeth 38 that engage the external teeth 30 and 34. The drive collar 36 is substantially fixed against rotation relative to the housing 12 to form an outer ring gear. The three planet gears 28 rotate within the drive collar 36 around the output shaft 22. The three planet gears 32 rotate within the drive collar 36 around the output shaft axis 24. The drive collar 36 includes at least one tab 40 extending parallel to the output shaft axis 24 toward the motor 14. The tabs 40 include radii 41, but in other embodiments, may be chamfered, where the tabs 40 are connected to the drive collar 36, to limit stress concentrations, as shown in FIGS. 3 and 4.

FIGS. 2-4 illustrate a front end bell housing or reference disk 42 that is substantially fixed to the housing 12 to inhibit rotation of the reference disk 42 with respect to the housing 12. In the illustrated embodiment, a pair of diametrically opposed roll pins 44 are pressed into the reference disk 42 and extend into the housing 12, but are not visible from outside the housing 12. The roll pins 44 permanently fix the reference disk 42 to the housing 12. About one half of the roll pin 44 is shown in FIG. 3, because the other half of the roll pin 44 extends into the reference disk 42. The reference disk 42 includes an aperture 46 extending along the output shaft axis 24 and a bearing 48 in the aperture 46 to support the output shaft 22. The reference disk 42 includes a main body 50 and a protrusion 52 extending along the output shaft axis 24 toward the tool output 18 that has a smaller diameter than the main body 50. The protrusion 52 defines a bore 53 having radially-inwardly extending or internal teeth 54.

A torque transducer 58 is positioned between the drive collar 36 and the reference disk 42 (see FIGS. 2-4). The torque transducer 58 includes a hub 60 that defines a cylinder having a circular aperture 62 that has an axis that is co-linear with the output shaft axis 24 (see FIGS. 4-7). The circular aperture 62 is smooth and receives the output shaft 22 therethrough. The circular aperture 62 is larger than the output shaft 22, such that the output shaft 22 rotates with respect to the housing, but the hub 60 is fixed with respect to the housing. The hub 60 includes external teeth 64 spaced radially from the aperture 62 and sized to engage the internal teeth 54 of the reference disk 42. The hub 60 is fixed to the housing 12 through the engagement of teeth 54 and teeth 64, since the reference disk 42 is fixed to the housing 12. The hub 60 includes a first, proximal end 66 and a second, distal end 68 spaced axially in the direction of the output shaft axis 24 from the first end 66. The teeth 64 are formed on the second end 68, but do not extend all the way to the first end 66. The hub 60 defines a hub thickness 70 in a radial direction, perpendicular to the output shaft axis 24 at the first end 66.

With further reference to FIGS. 4-7, the torque transducer 58 further includes a web 74 coupled to the hub 60 at the hub first end 66 and extending outward in a plane perpendicular to the output shaft axis 24. The hub 60 extends in cantilever fashion from the proximal end 66, where it is attached to or integral with the web 74, to the distal end 68. The web 74 extends radially outward from the hub 60 and is continuous around the perimeter of the hub 60. The web 74 has a thickness 76 in a direction parallel to the output shaft axis 24. The web thickness 76 is less than half of the hub thickness 70.

The torque transducer 58 further includes a rim 80 having a first end 82 and a second end 84 spaced from the first end 82 along the output shaft axis 24. The rim 80 is coupled to the web 74 between the rim first end 82 and the rim second end 84, such that the web 74 bisects the rim 80. The bisecting configuration provides substantially even stress distribution over the entire web 74 by minimizing bending stresses on the web 74 created by the rim 80. The rim 80 defines a first thickness 86 in a radial direction at the rim first end 82 and a second thickness 88 in a radial direction at the rim second end 84. The second rim thickness 88 is greater than the first rim thickness 86. The hub thickness 70 is greater than each of the first rim thickness 86 and the second rim thickness 88, whereas the web thickness 76 is less than either the first rim thickness 86 or the second rim thickness 88.

The web 74 forms an unbroken ring extending in a plane perpendicular to the output shaft axis 24 and thus radially outward from the hub 60 to the rim 80. The web 74 is disk-shaped with a central aperture defined by the hub aperture 62. The web 74 has a constant thickness across the entire extent between the hub 60 and the rim 80. The web 74 defines a continuous ring-shaped planar surface extending from the hub 60 to the rim 80. The web 74 extends parallel to first and second end surfaces of the hub 60 and parallel to first and second end surfaces of the rim 80. The web 74 is co-planar with the first end surface of the hub 60, but is not co-planar with the first and second end surfaces of the rim 80, or the second end surface of the hub 60.

The torque transducer 58 defines a first cavity 92 between the rim 80 at the rim first end 82 along the web 74. The first cavity 92 is unbroken by the hub 60, because the hub first end 66 is co-planar with the web 74. The first cavity 92 has a solid cylindrical shape. The torque transducer 58 defines a second cavity 94 between the hub 60 and the rim 80 at the rim second end 84 along the web 74. The second cavity 94 has an annular shape. that is bound by the hub 60 and rim 80. The reference disk protrusion 52 extends at least partially into the second cavity 94, such that teeth 56 and 64 are engaged, as shown in FIG. 4.

With further reference to FIGS. 4-7, the illustrated rim 80 includes two diametrically opposed keyways 100 that are sized to receive the respective tabs 40. The keyways 100 extend from the rim first end 82 to the rim second end 84 parallel to the output shaft axis 24. The keyways 100 include outwardly angled portions 101 adjacent the rim first end 82 that accommodate for the radii 41 on the tabs 40. The keyways 100 define a first length 102 at the rim first end 82 and a second length 104 at the rim second end 84. The rim first length 102 is greater than the rim second length 104 due to the outwardly angled portions 101. In other embodiments, more or fewer tabs 40 and keyways 100 are used. Two diametrically opposed tabs 40 and keyways 100 are used as an example only, and are not intended to limit the scope of the present invention.

The torque transducer 58 is formed from stainless steel and is manufactured by metal injection molding. The torque transducer 58 is integrally formed as a single unitary or monolithic piece. In another embodiment, the torque transducer 58 can be machined or otherwise formed as one unitary piece.

The torque transducer 58 can move a small distance along the output shaft axis 24 between the drive collar 36 and the reference disk 42. The torque transducer 58 is inhibited from moving radially by the housing 12, the reference disk 42 and the drive collar 36. As discussed above, the reference disk 42 is fixed to the housing 12 by the roll pins 44. The torque transducer 58 is inhibited from rotating with respect to the reference disk 42 by the respective teeth 64 and 54. However, when the first and second sets of gears 28, 32 experience increased resistance, such as when a fastener has been fully inserted into a workpiece, the first and second sets of gears 28, 32 can transfer some torque to the drive collar 36. The drive collar 36 in turn, can transfer the torque to the torque transducer 58 via the tabs 40 and keyways 100.

The geometry of the torque transducer 58 reduces or eliminates stress concentrations and provides for more uniform stress distribution across the web 74, even adjacent the keyways 100. The rim 80 is thick to inhibit the web 74 from bending in response to the torque. The torque transducer 58 includes at least one strain gage 106 positioned on the web 74 that measures the torque or strain on the torque transducer 58 (see FIG. 6). In some embodiments, multiple strain gages are utilized, however any suitable number of strain gages can be utilized to provide accurate strain data. When the measured strain exceeds a set amount, the power tool 10 is put into neutral or turned off to stop rotation of the output shaft 22. The geometry of the torque transducer 58 is smaller and easier to manufacture than previous torque transducers, while maintaining the required accuracy.

Various features and advantages of the invention are set forth in the following claims.

What is claimed is:

1. A power tool comprising:
   a motor having an output shaft that defines an axis;
   a drive train operably coupled to the output shaft and operable to drive a tool output;
   a housing at least partially surrounding the motor and the drive train;
   a reference disk fixedly coupled to the housing;
   a collar including internal teeth that engage at least a portion of the drive train; and
   a torque transducer having a hub, a web and a rim, the torque transducer positioned substantially between the collar and the reference disk such that the rim is coupled to the collar and the hub is coupled to the reference disk, wherein the web defines a first thickness measured parallel to the axis and the rim defines a second thickness measured in a radial direction with respect to the axis, the second thickness being greater than the first thickness.

2. The power tool of claim 1, wherein the web defines an unbroken ring perpendicular to the axis, extending from the hub to the rim.

3. The power tool of claim 2, wherein the unbroken ring has a constant thickness across the entire extent between the hub and the rim.

4. The power tool of claim 1, wherein the hub has a substantially cylindrical shape that includes a central aperture through which the output shaft extends and an outer surface having a plurality of teeth thereon.

5. The power tool of claim 4, wherein the reference disk includes a bore having internal teeth sized to drivingly engage the hub teeth.

6. The power tool of claim 1, further comprising at least one strain gage positioned on the web to measure strain on the web during operation of the power tool.

7. The power tool of claim 1, wherein the rim is discontinuous to define at least one keyway and the collar includes at least one tab that engages the at least one keyway to resist relative rotation between the torque transducer and the collar.

8. The power tool of claim 7, wherein the at least one keyway includes two diametrically opposed keyways and the at least one tab includes diametrically opposed tabs, such that the keyways each receive a respective tab.

9. The power tool of claim 8, wherein the tabs each include radii, wherein the rim defines a first end and a second end spaced from the first end in the direction of the axis, wherein the keyways extend parallel to the axis at the rim second end and taper outward at the rim first end, such that the keyways are wider at the rim first end than at the rim second end, and wherein the tabs extend into the keyways with the tab radii received in the outwardly-tapered first end.

10. The power tool of claim 1, wherein the torque transducer is permitted to move axially with respect to the reference disk and housing, but is inhibited from rotating with respect to the reference disk and housing.

11. The power tool of claim 1, further comprising a pin extending at least partially through the housing and the reference disk to fixedly couple the reference disk to the housing.

12. The power tool of claim 1, wherein the hub is coupled to the web at a hub first end and the rim is coupled to the web between a rim first end and a rim second end, such that the web bisects the rim.

13. A torque transducer comprising:
   a hub defining an aperture therethrough, the aperture defining an axis, the hub having a hub first end and a hub second end spaced along the axis, and defining a first thickness in a radial direction, perpendicular to the axis;
   a web coupled to the hub at the hub first end, the web defining an unbroken ring in a plane perpendicular to the axis and defining a second thickness measured in the direction of the axis, wherein the second thickness is less than one half of the first thickness; and
   a rim having a rim first end and a rim second end spaced from the rim first end along the axis, the rim coupled to the web, the rim defining a perimeter that includes at least one keyway in an exterior of the perimeter.

14. The torque transducer of claim 13, wherein the at least one keyway includes first and second keyways, such that the first keyway is diametrically opposed to the second keyway.

15. The torque transducer of claim 13, wherein the at least one keyway extends parallel to the axis at the rim second end and tapers outward at the rim first end, such that the keyway is wider at the rim first end than at the rim second end.

16. The torque transducer of claim 13, wherein the rim is coupled to the web between the rim first end and the rim second end, such that the web bisects the rim.

17. The torque transducer of claim 13, wherein the hub defines a substantially cylindrical shape that has an inner surface and an outer surface, such that the inner surface is smooth and the outer surface includes a plurality of teeth extending from the hub second end toward the hub first end.

18. The torque transducer of claim 13, wherein:
   the web and the rim define a first cavity extending from one portion of the rim to a diametrically opposed portion of the rim uninterrupted by the hub; and
   the web, the rim, and the hub define a second cavity of annular shape extending from the rim to the hub.

19. The torque transducer of claim 13, wherein the rim defines a first rim thickness measured in a radial direction with respect to the axis at the rim first end and a second rim thickness measured in a radial direction at the rim second end, such that the second rim thickness is greater than the first rim thickness, and wherein the second thickness is less than half of each of the first rim thickness and the second rim thickness.

20. A torque transducer comprising:
   a hub defining an aperture therethrough, the aperture defining an axis, the hub having a proximal hub first end and a distal hub second end spaced along the axis, and defining a first thickness in a radial direction, perpendicular to the axis, the hub defining a substantially cylindrical shape having an inner surface and an outer surface, such that the inner surface is smooth and the outer surface includes a plurality of teeth extending from the distal hub second end toward the proximal hub first end;
   a web coupled to the hub at the proximal hub first end, the web defining an unbroken ring in a plane perpendicular to the axis and defining a second thickness measured in the direction of the axis, wherein the second thickness is less than one half of the first thickness; and
   a rim having a rim first end and a rim second end spaced from the rim first end along the axis, the rim coupled to the web between the rim first end and the rim second end, such that the web bisects the rim, the rim defining a perimeter that includes first and second keyways in an exterior of the perimeter, such that the first keyway is diametrically opposed from the second keyway, the keyways extending parallel to the axis at the rim second end and tapering outward at the rim first end, such that the keyways are wider at the rim first end than at the rim second end, the rim defining a first rim thickness measured in a radial direction at the rim first end and a second rim thickness measured in a radial direction at the rim second end, such that the second rim thickness is greater than the first rim thickness, and the second thickness is less than half of each of the first rim thickness and the second rim thickness, the web and rim defining a first cavity extending from one portion of the rim to a diametrically opposed portion of the rim uninterrupted by the hub, and the web, rim and hub defining a second cavity extending from the rim to the hub.

* * * * *